N. H. NELSON.
ANTISKID CHAIN.
APPLICATION FILED JAN. 22, 1920.

1,395,057.

Patented Oct. 25, 1921.

INVENTOR
Nels H. Nelson
BY
Bradbury & Caswell
ATTORNEYS.

UNITED STATES PATENT OFFICE.

NELS H. NELSON, OF WILLMAR, MINNESOTA.

ANTISKID-CHAIN.

1,395,057.  Specification of Letters Patent.  Patented Oct. 25, 1921.

Application filed January 22, 1920. Serial No. 353,179.

*To all whom it may concern:*

Be it known that I, NELS H. NELSON, a citizen of the United States, residing at Willmar, in the county of Kandiyohi and State of Minnesota, have invented a new and useful Improvement in Antiskid-Chains, of which the following is a specification.

This invention relates to improvements in anti-skidding chains for cushion tires the primary object being the production of a chain of the character stated which will more effectively prevent side skidding as well as longitudinal slipping. With this and other objects in view my invention comprises the features of construction and combination of parts hereinafter particularly described and claimed.

Figure 1:
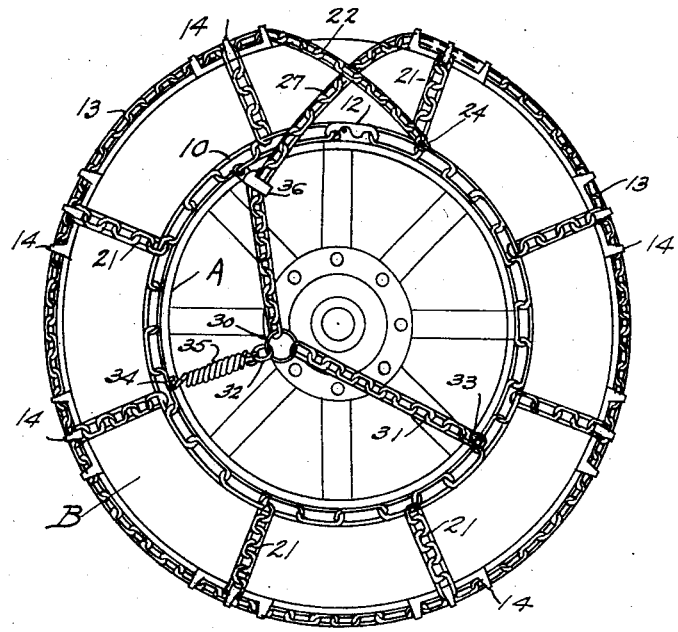
Figure 2:
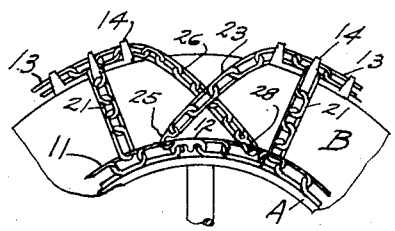
Figure 3:
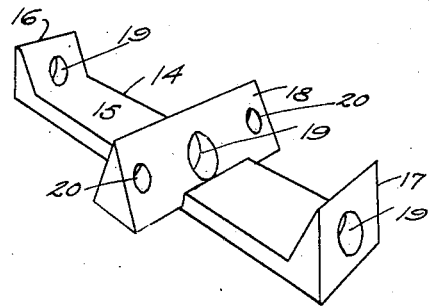

In the accompanying drawing forming part of this specification, Figure 1 is a side elevation of an automobile wheel having a pneumatic tire and my invention applied thereto; Fig. 2 is another side elevation of a detail of the structure shown in Fig. 1, looking at the other side of the wheel, and Fig. 3 is a perspective view of one of the anti-skidding shoes used with my invention.

In the drawing let A indicate an automobile wheel of usual construction having the usual pneumatic tire B mounted thereon. Secured over this wheel is my improved anti-skidding chain which has included in its structure two oppositely positioned side chains 10 and 11, having the ends of each chain secured by detachable couplings 12 to form rings concentrically arranged on the axis of the wheel on opposite sides of the tire. These rings are preferably of smaller diameter than the inner diameter of the tire to reduce the tendency of the chains becoming detached from the wheel. Disposed on the outer extremity of the tire and circumferentially thereof is a longitudinal central chain 13, situated midway between the side chains, said central member being provided at substantially even intervals with anti-skidding shoes 14, all of similar construction, and each consisting of a longitudinal plate 15 and three transverse outwardly projecting and tapering calks 16, 17 and 18, the calks 16 and 17 being positioned at the end of the plate 15 and the calk 18 being placed midway between the end calks and projecting laterally from the plate 15 to increase the gripping engagement on the ground of the shoe. The calks 16, 17 and 18 have a series of alined passages 19, through which the central chain 13 passes freely and the central calk has a pair of openings 20 near its outer ends through which lateral chain flights 21 disposed at frequent intervals across the tire engage and fasten the shoes to the side chain. Thus there is freedom of movement between the central circumferential chain 13 and the shoes and lateral chain flights.

One end of the central circumferential chain 13 is attached by the pair of diagonally arranged branch chains 22 and 23 to the side chains, the branch chain 22 being detachably secured to the side chain 10 by the coupling 24 and the branch 23 being detachably secured to the side chain 11 by the coupling 25. The opposite end of the central chain 13 which terminates a short distance from the end to which the branches 22 and 23 are attached is provided with two diagonal branches 26 and 27, the branch 26 being detachably coupled to the side chain 11 by the coupling 28 and the branch 27 being extended inwardly of the wheel and secured in the following manner to automatically take up any slack of the chain and hold it tight on the wheel to prevent rattling, reduce wear and increase efficiency of operation. This branch 27 is connected to a distributing ring 30 and to this distributing ring are attached two radiating chain branches 31 and 32, the outer ends of which have detachable couplings 33 and 34 coupled into the side chain 10. The branch 32 contains a slack take up tension spring 35 which compensates wear and stretch of the entire device and tends to hold the device in place. A hook 36 attached to the side chain 10 as shown, engaging the branch 27 between its ends serves to hold the branch at a less angle to the central chain 13 and hence in more effective position to hold said central chain tight.

In use the central chain and freely disposed shoes thereon tend to prevent lateral skidding of the tire most effectively, said shoes and lateral flights also serving to hold the central chain in central outermost position on the tire. The shoes and lateral chain flights also tend to prevent spinning and longitudinal slipping of the wheel by engaging the ground transversely. The mode of attaching the ends of the central chain further holds the chain tight at all times by taking up slack automatically when the tire is compressed or soft.

In accordance with the patent statutes, I have described the principles of operation of my invention together with the apparatus which I now consider to represent the best embodiment thereof but I desire to have it understood that the construction is only illustrative and that the invention can be carried out by other means and applied to uses other than those above set forth within the scope of the following claims.

Having described my invention what I claim as new and desire to secure by Letters Patent is:

1. A chain grip for elastic tires, comprising, in combination, an intermediate flexible circumferential member freely disposed to move circumferentially on the outermost portion between the sides of the tire to reduce skidding, a pair of circumferential side members of less diameter than the first mentioned member and disposed at the opposite sides of the tire and a plurality of flexible lateral flights at intervals across the tire, having their ends anchored to said side members and their portions intermediate of their ends slidably coupled to said intermediate circumferential member, whereby the intermediate member may travel freely circumferentially of the tire but is limited in movement laterally of the tire.

2. A chain grip for elastic tires, comprising, a pair of separable inner annular chains adapted to be disposed on opposite sides of a tire, a central annular chain adapted to substantially encircle the outermost portion circumferentially of the tire to reduce side skidding, a plurality of lateral flights at intervals around the tire and attached to said side chains, and an anti-skidding shoe at the junction of each lateral flight and said central chain, said shoe being secured to said flight and movably coupled to said central chain to permit free longitudinal movement between said members.

3. A chain grip for elastic tires, comprising, a pair of inner annular chains adapted to be disposed on opposite sides of a tire, a central chain adapted to be disposed longitudinally on the outermost portion of the tread surface circumferentially of the tire to reduce side skidding, said central chain being attached by branches on one end to said side chains and by one branch on its opposite end directly to one of said side chains and by the remaining branch to the opposite side chain, said remaining branch containing a slack take up resilient connection adapted to tighten the entire grip on the tire.

In testimony whereof, I have signed my name to this specification.

NELS H. NELSON.